US010110543B2

(12) United States Patent
Irmak et al.

(10) Patent No.: US 10,110,543 B2
(45) Date of Patent: Oct. 23, 2018

(54) PERSONALIZED MESSAGES FOR PRODUCT ONBOARDING

(71) Applicant: Microsoft Technology Licensing, LLC, Redmond, WA (US)

(72) Inventors: Utku Irmak, San Francisco, CA (US); Sean Seol Woong Choi, Los Angeles, CA (US); Lawrence Yuan, Campbell, CA (US); Benjamin Lai, Mountain View, CA (US); Wynn Chen, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 14/631,728

(22) Filed: Feb. 25, 2015

(65) Prior Publication Data
US 2016/0127297 A1 May 5, 2016

Related U.S. Application Data

(60) Provisional application No. 62/073,848, filed on Oct. 31, 2014.

(51) Int. Cl.
*G06F 15/16* (2006.01)
*H04L 12/58* (2006.01)
*G06Q 50/00* (2012.01)

(52) U.S. Cl.
CPC ............ *H04L 51/32* (2013.01); *G06Q 50/01* (2013.01)

(58) Field of Classification Search
CPC ...................................................... H04L 51/32
See application file for complete search history.

(56) References Cited

U.S. PATENT DOCUMENTS

| 8,719,347 B1 * | 5/2014 | Tomkins ........... G06F 17/30041 709/204 |
| 9,444,705 B2 * | 9/2016 | O'Sullivan ....... G06F 17/30312 |
| 2010/0017294 A1 * | 1/2010 | Mancarella .......... G06Q 10/107 705/14.55 |
| 2011/0289011 A1 * | 11/2011 | Hull .................... G06Q 10/107 705/319 |

(Continued)

*Primary Examiner* — Joseph E Avellino
*Assistant Examiner* — Rachel J Hackenberg
(74) *Attorney, Agent, or Firm* — Schwegman Lundberg & Woessner, P.A.

(57) ABSTRACT

Techniques for onboarding users to online product features are described. According to various embodiments, email content data describing an email type of an email to be transmitted to a particular member is accessed. Information identifying a plurality of candidate onboarding content items associated with the email type is also accessed. Feature data including member onboarding content item interaction data describing the particular member's interactions with various onboarding content items is also accessed. Thereafter, for the particular member and the email type, a relevance score is generated for each of the candidate onboarding content items, based on the email content data and the member onboarding content item interaction data. Each of the relevance scores may indicate a likelihood that the particular member selects the corresponding candidate onboarding content item. A specific onboarding content item is then selected from the plurality of candidate onboarding content items, based on the generated relevance scores.

19 Claims, 11 Drawing Sheets

(56) References Cited

U.S. PATENT DOCUMENTS

2011/0313941 A1* 12/2011 Rahman ............ G06Q 10/1053
　　　　　　　　　　　　　　　　　　　　　705/321
2013/0073366 A1* 3/2013 Heath ................ G06Q 30/0261
　　　　　　　　　　　　　　　　　　　　　705/14.25

* cited by examiner

PERSONALIZED MESSAGES FOR PRODUCT ONBOARDING

This application claims the priority benefit of U.S. Provisional Application No. 62/073,848, filed Oct. 31, 2014, which is incorporated herein by reference.

TECHNICAL FIELD

The present application relates generally to data processing systems and, in one specific example, to techniques for onboarding users to online product features.

BACKGROUND

Online social network services such as LinkedIn® feature a wide range of products that are offered to millions of members. Further, such online social network services typically send a very large number of emails to members, where such emails may include information describing news, updates, features, products, offers, etc., associated with the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for onboarding users to online product features are described. In the following description, for purposes of explanation, numerous specific details are set forth in order to provide a thorough understanding of example embodiments. It will be evident, however, to one skilled in the art that the embodiments of the present disclosure may be practiced without these specific details.

Figure 1:
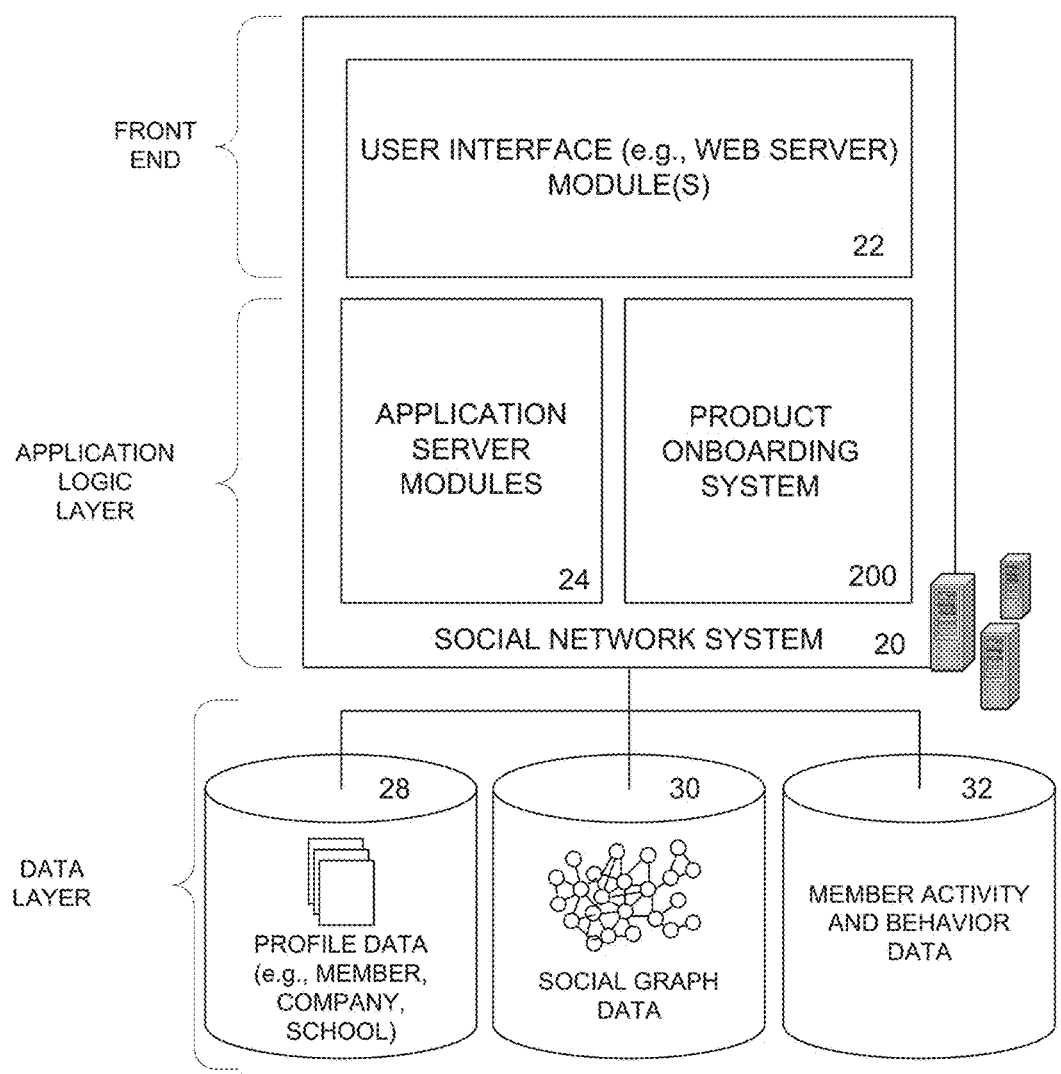
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a product onboarding system 200. The product onboarding system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
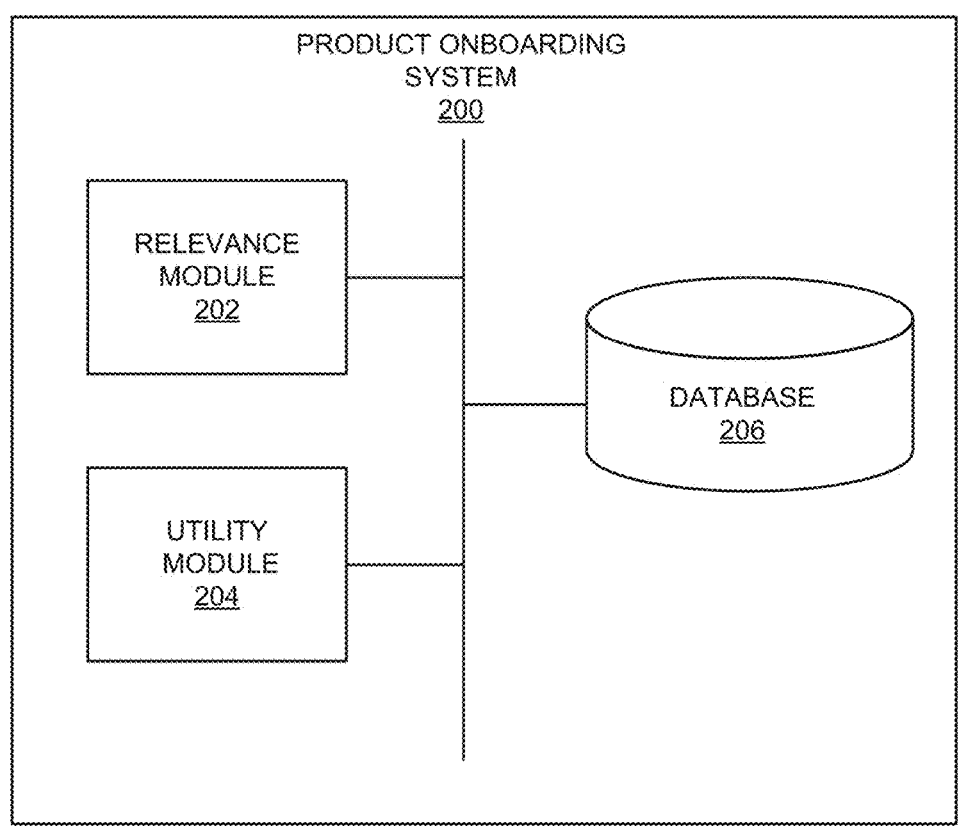
FIG. 2 is a block diagram of an example system, according to various embodiments.

Turning now to FIG. 2, a product onboarding system 200 includes a relevance module 202, a utility module 204, and a database 206. The modules of the product onboarding system 200 may be implemented on or executed by a single device such as a product onboarding device, or on separate devices interconnected via a network. The aforementioned product onboarding device may be, for example, one or more client machines or application servers. The operation of each of the aforementioned modules of the product onboarding system 200 will now be described in greater detail in conjunction with the figures.

According to various example embodiments, a product onboarding system is configured to leverage various types of emails already being transmitted to members of an online social network service such as LinkedIn®, in order to educate members about various product features and value propositions of the online social network service, and to help onboard such members to the aforementioned product features and value propositions of the online social network service.

Figure 3:
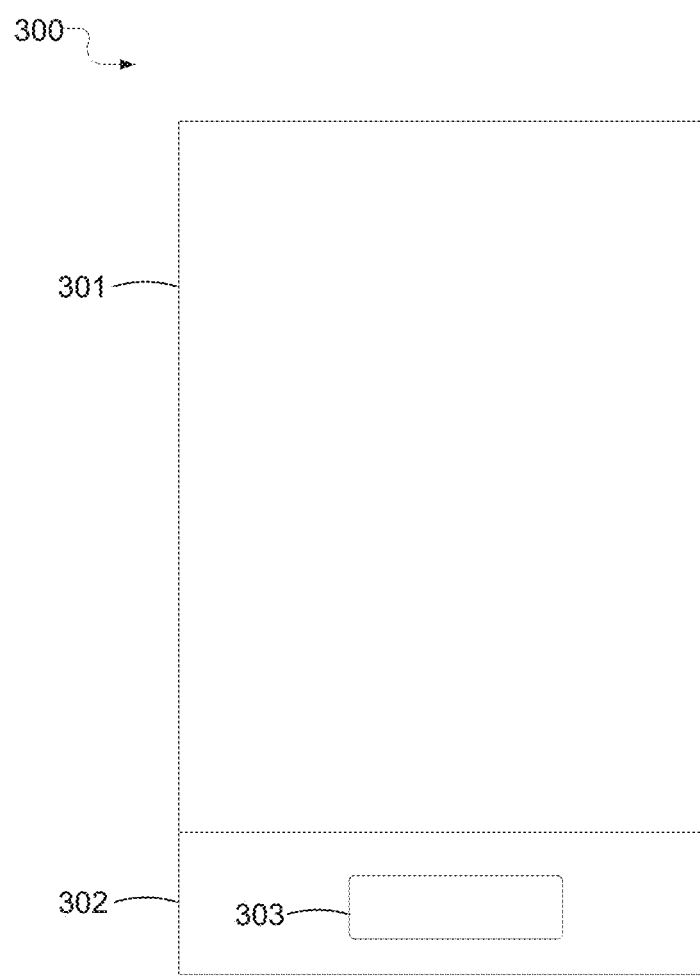
FIG. 3 illustrates an example email, according to various embodiments.
Figure 9:
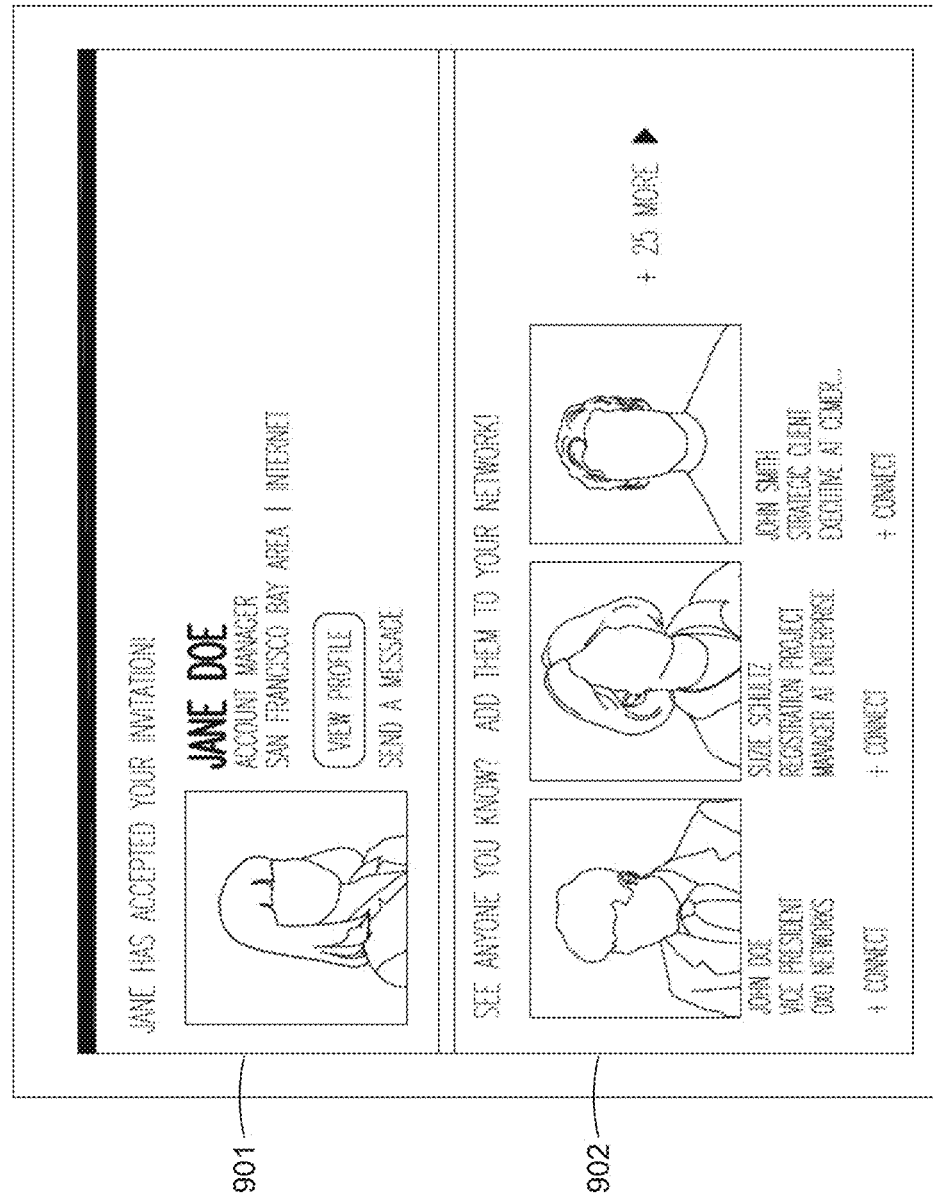
FIG. 9 illustrates an example email, according to various embodiments.

For example, as described in various embodiments herein, an email may be modified to include a specific portion of content (e.g., at the bottom of the email) that may be referred to herein as a "widget", "product/feature onboarding content item", "onboarding content item", "snack", or "snack" content item (or, alternatively, as an "upsell", "promotion", "promotional", or "sample" content item) that displays information about a particular value proposition or product or service, such as a value proposition or product or service associated with an online social network service (e.g., a "people you may know" or a "network update stream" product on the LinkedIn® social network service, and so on). Thus, the product feature onboarding content may be similar to an advertisement and may be configured to promote (or provide a user with a sample of) different types of products and services of the online social network service. For example, FIG. 3 illustrates an exemplary email 300, where the email 300 includes a main or body portion 301 with one or more pieces of content, as well as a lower portion 302 that includes an onboarding content item 303. As another example, FIG. 9 illustrates an exemplary invite-accept email 900, where the invite-accept email 900 includes a main or body portion 901 with one or more pieces of content (e.g., indicating that another member Jane Doe has accepted a connection invitation sent by the recipient of the email 900), as well as a lower portion that includes a people-you-may-know (PYMK) onboarding content item 902. Thus, such onboarding content items are similar to advertisements, in that they may inform members about products and features, where the resulting increase in member awareness of such products and features may eventually lead to increased member engagement with such products and features. Onboarding content items may be included in any type of email, such as network update emails, content digest emails, group digest emails, and so on, in order to encourage users to become engaged with various products on LinkedIn® or another website or service. It is understood that an email may
include multiple instances of product feature onboarding content anywhere in the email (and not necessarily at the bottom of the email).

Accordingly, the framework and techniques described in various embodiments herein may be utilized to find what onboarding content item makes more sense for each email and/or for each user. More specifically, the product onboarding system described herein may be utilized to determine the particular type and form of product feature onboarding content that is most appropriate to include in a particular email having other types of content, consistent with various embodiments described herein.

Accordingly, the product onboarding system described herein is configured to place the most appropriate onboarding content item in front of the most appropriate user at the most appropriate time to help them get the most out of an online social network service such as LinkedIn®. This may be particularly beneficial as a large proportion of online social network service users (e.g., LinkedIn®'s users) are not onboarded to various product features and value propositions of the online social network service (e.g., Network-related, Career-related, Profile-related, or Content-related product features of the LinkedIn® online social network service). In the case of LinkedIn®, for example, many of these users do not visit the site regularly, making it difficult for the online social network service to onboard them/educate them on site product features. Accordingly, email represents a huge opportunity. For example, the LinkedIn® online social network service sends 1 Billion emails reaching more than 180 million users every week, the email channel already drives a large portion of all traffic to the LinkedIn® site, and email accounts for a large portion of a user experiences on LinkedIn®. The onboarding techniques described herein can insert relevant onboarding content items in existing emails, and can also insert relevant onboarding content items in stand-alone emails (e.g., emails that include only one or more onboarding content items with no traditional body). In the example online social network service of LinkedIn®, the product onboarding system described herein may lead to increases in various user interactions with the site, such as increases in invitations sent, content follow actions, job views, profile edits, and so on.

The embodiments described herein are applicable not only to emails but to any type of electronic message, including an email, text message (e.g., a short messaging service (SMS) message, a multimedia messaging service (MMS) message, etc.), an instant message associated with an online social network (e.g., Facebook®, LinkedIn®, Wechat®, WhatsApp®, etc.), a chat message associated with an online chat service, and so on.

Figure 4:
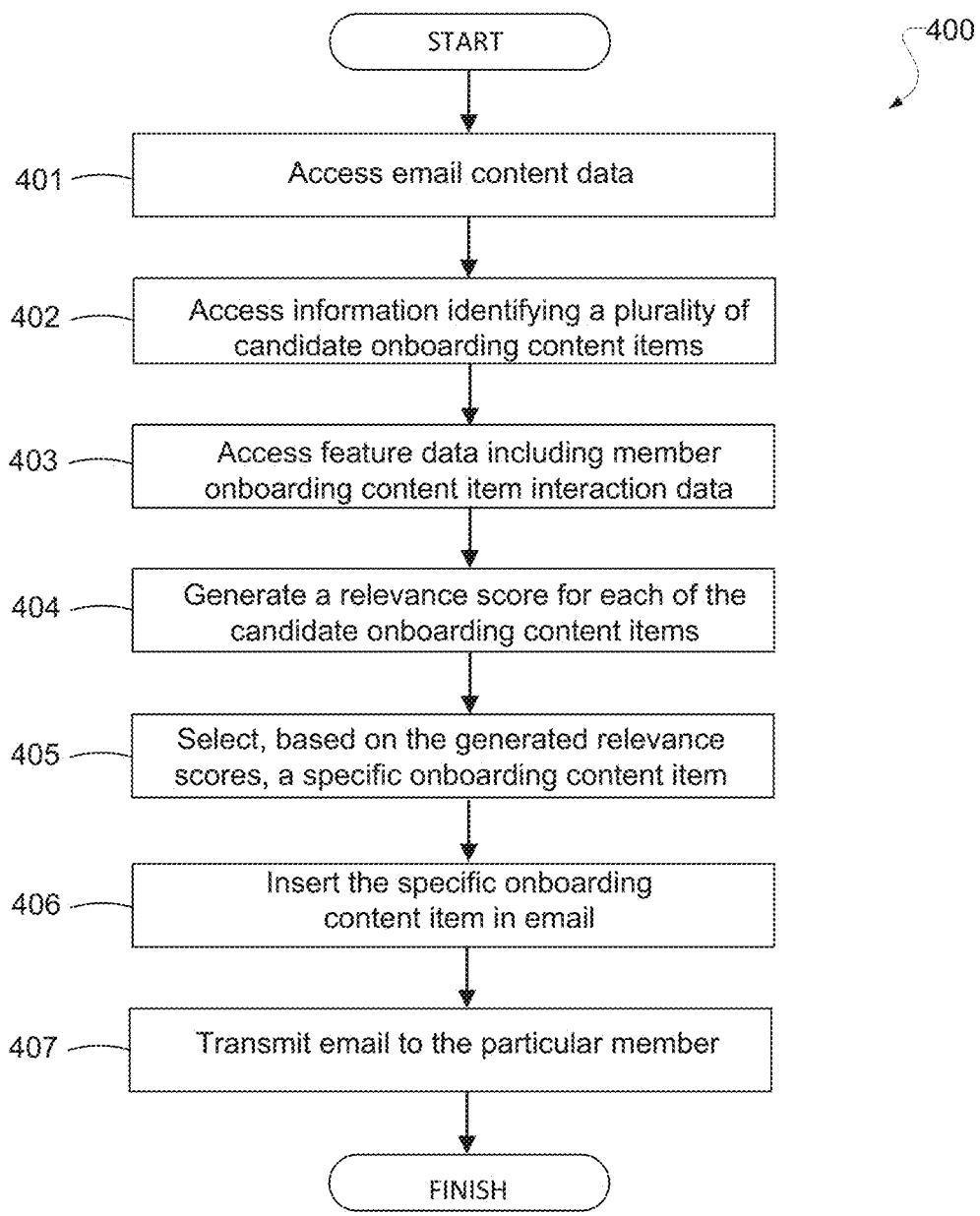
FIG. 4 is a flowchart illustrating an example method, according to various embodiments.

FIG. 4 is a flowchart illustrating an example method 400, consistent with various embodiments described above. The method 400 may be performed at least in part by, for example, the product onboarding system 200 illustrated in FIG. 2 (or an apparatus having similar modules, such as one or more client machines or application servers). In operation 401, the relevance module 202 accesses, via one or more data sources (e.g., database 206), email content data describing an email type of an email to be transmitted to a particular member of an online social network service. In operation 402, the relevance module 202 accesses, via one or more data sources (e.g., database 206), information identifying a plurality of candidate onboarding content items associated with the email type, each of the plurality of candidate onboarding content items being configured to promote a product feature associated with the online social network service. For example, the relevance module 202 may access a list indicating various email types, and various types of onboarding content items that are eligible for inclusion in each of the email types.

In operation 403, the relevance module 202 accesses, via one or more data sources (e.g., database 206), feature data including member onboarding content item interaction data describing the particular member's interactions with various onboarding content items. In operation 404, the relevance module 202 generates, based on the email content data and the member onboarding content item interaction data, for the particular member and the email type, a relevance score for each of the candidate onboarding content items, each of the relevance scores indicating a likelihood that the particular member selects the corresponding candidate onboarding content item in an email. In operation 405, the relevance module 202 selects, based on the generated relevance scores, a specific onboarding content item from the plurality of candidate onboarding content items. For example, the relevance module 202 may select the candidate onboarding content item having the highest relevance score and/or the relevance score indicating the highest likelihood that the particular member will select the corresponding candidate onboarding content item in an email. In some embodiments, the relevance module 202 may select more than one onboarding content item (e.g., the top X onboarding content items, or a predetermined number X of onboarding content items associated with the highest likelihoods). In operation 406, the relevance module 202 inserts the specific onboarding content item selected in operation 405 in the email to be transmitted to the particular member. In some embodiments, if more than one onboarding content item was selected in operation 405, then these multiple onboarding content items may be inserted in operation 406 into the email to be transmitted to the particular member. In operation 407, the relevance module 202 transmits the email to the particular member. Thus, in some embodiments, the relevance module 202 of the product onboarding system 200 may be associated with (or may correspond to or include) a mail server or mail application (e.g., Google® Gmail, Yahoo® mail, etc.) configured to transmit emails to members via various known email protocols (e.g., Simple Mail Transfer Protocol (SMTP)). It is contemplated that the operations of method 400 may incorporate any of the other features disclosed herein. Various operations in the method 400 may be omitted or rearranged, as necessary.

In some embodiments, the generating of the relevance scores (operation 404) comprises performing prediction modeling, based on the feature data described herein and a trained prediction model, to predict the likelihood of the particular member selecting the corresponding candidate onboarding content item. The prediction model may be any one of a logistic regression model, a Naïve Bayes model, a support vector machines (SVM) model, a decision trees model, and a neural network model. Aspects of the prediction module that may be performed by the relevance module 202 are described in greater detail below.

In some embodiments, the email content data specifies the email type and/or a product that the email relates to. Non-limiting examples of types of emails include a network connection update email (e.g., summarizing compelling changes in the member's network, such as job changes, anniversaries, new members in network, etc.), a news update email, a content feed or network update stream (NUS) digest email indicating posts, articles, news items, publications, etc., associated with a content feed of an online social network service, a jobs update email (e.g., a Jobs-You-May-Be-Interested-In (JYMBII) email describing the jobs that may be of interest to the current member), an influencer post update email, a company update email, a people-you-may-know (PYMK) email, a who-has-viewed-your-profile (WVYP) email, an invite-accept email indicating that another member has accepted a connection invitation of the current member, an member-to-member (M2M) invitation email indicating that another member has invited the current member to connect with the other member, an M2M invitation reminder email reminding the current member of a pending member-to-member invitation, a group update email (e.g., summarizing information from group entities that the current member is associated with), a member-to-group invite email from a member to a group administrator requesting to join a group, a member-to-group reminder email reminding a group administrator of a member to group invitation, an educational institution (e.g., school or university) update email, a recommendation email, and a recruiters you may want to contact email, a content ecosystem digest (CED) email including news articles, and so on. The embodiments described herein are also applicable to other types of emails known by those skilled in the art, such as emails transmitted by an online social network service. The email content data may also specify other information about the email, such as whether other onboarding content items are going to be included in the email to be sent to the member.

As described above, the member onboarding content item interaction data describes the particular member's previous or historical interactions with various onboarding content items. For example, the member onboarding content item interaction data may describe a total number of views or impressions by the particular member of various onboarding content items, a total number of clicks by the particular member of the various onboarding content items, information describing a context (e.g., time, date, user location, desktop session, mobile session, iOS session. Android session, position/format/appearance of onboarding content item in email, etc.) of each of the clicks by the particular member of the various onboarding content items, a time interval since a last click by the particular member of the various onboarding content items, and so on.

Thus, if the member onboarding content item interaction data indicates that a given member tends to click on certain types of onboarding content items (e.g., in certain contexts described above), then the relevance module 202 may determine, via the machine learning and prediction modelling techniques described herein, that there is a high likelihood that the given member will also click on that type of onboarding content item again (e.g., in a certain context).

In some embodiments, the member onboarding content item interaction data may describe the member's previous or historical interactions with various onboarding content items when they are included in certain email types (in contrast to general descriptions of interactions with various onboarding content items across all email types, as described above). For example, the member onboarding content item interaction data may describe a number of views or impressions by the particular member of various onboarding content items included in various types of emails, a total number of clicks by the particular member of various onboarding content items included in various types of emails, information describing a context (e.g., time, date, user location, desktop session, mobile session, iOS session, Android session, position/format/appearance of onboarding content item in email, etc.) of each of the clicks by the particular member of the various onboarding content items included in various types of emails, a time interval since a last click by the member of various onboarding content items included in various types of emails, and so on.

Thus, if the member onboarding content item interaction data indicates that a given member tends to click on certain types of onboarding content items included in certain types of emails (e.g., in certain contexts described above), then the relevance module 202 may determine, via the machine learning and prediction modelling techniques described herein, that there is a high likelihood that the given member will also click on that type of onboarding content item again if it is included in that type of email (e.g., in certain contexts).

In some embodiments, the member onboarding content item interaction data may describe the member's previous or historical interactions with various onboarding content items that are displayed in an email in combination with other onboarding content items. For example, a given email (e.g., a news update email) may include more than one onboarding content item (e.g., a "jobs you may be interested" onboarding content item, and a "people you may know" onboarding content item). Thus, the member onboarding content item interaction data may describe a number of views or impressions by the particular member of various onboarding content items that were displayed in combination with one or more other onboarding content items, a total number of clicks by the particular member of various onboarding content items that were displayed in combination with one or more other onboarding content items, information describing a context (e.g., time, date, user location, desktop session, mobile session, iOS session, Android session, position/format/appearance of onboarding content item in email, etc.) of each of the clicks by the particular member of the various onboarding content items that were displayed in combination with one or more other onboarding content items, a time interval since a last click by the member of various onboarding content items that were displayed in combination with one or more other onboarding content items, and so on.

Thus, suppose the member onboarding content item interaction data indicates that a given member tends to click on certain types of onboarding content items (e.g., a "jobs you may be interested" onboarding content item) when it is displayed together with a second type of onboarding content item (e.g., "a people you may know" onboarding content item) in an email, but that the given member tends not to click on that type of onboarding content item when it is displayed together with all other types of onboarding content items in an email. Thus, the relevance module 202 may determine, via the machine learning and prediction modelling techniques described herein, that there is a high likelihood that the given member will also click on that "jobs you may be interested" onboarding content item again if it is displayed together with a "a people you may know" onboarding content item, but not if it is displayed together with any other type of onboarding content item.

In some embodiments, the feature data further includes member email interaction data (or member message interaction data) describing the particular member's interactions with various email content (or various message content). The member email interaction data indicates a quantity of emails of various email types transmitted to the particular member, a quantity of clicks submitted by the particular member in conjunction with the emails of various email types, information describing a context (e.g., time, date, user location, desktop session, mobile session, iOS session, Android session, etc.) of each of the clicks by the particular member of the emails of various types, and a quantity of email unsubscribe requests submitted by the particular member in conjunction with the various email types.

Thus, if the member email interaction data indicates that a given member tends to click on certain types of email content items (e.g., in certain contexts described above), then the relevance module 202 may determine, via the machine learning and prediction modelling techniques described herein, that there is a high likelihood that the given member will click on that type of email content item again (e.g., in certain contexts described above). Moreover, if the product onboarding system 200 accesses information indicating a known relationship between email content item A and onboarding content item B (e.g., they relate to a similar product, feature, or value proposition of the online social networking service), then the product onboarding system 200 may determine that the high likelihood of clicking on a particular type of email content (e.g., "a jobs you may be interested email") may equate to a high likelihood of clicking on the related type of onboarding content item (e.g., a "jobs you may be interested" onboarding content item contained within an email related to another product item, such as a news update email).

In some embodiments, the feature data further includes member site interaction data describing the particular member's interactions with various products, features, or website content associated with a website of the online social network service (e.g., product modules on the homepage of a social network service). For example, the member site interaction data may indicate the total number of views or impressions by the particular member of various website content, a total number of clicks by the particular member of the various website content, information describing a context (e.g., time, date, user location, desktop session, mobile session, iOS session, Android session, etc.) of each of the clicks by the particular member of the various website content, a time interval since a last click by the particular member of the website content, and so on. The member site interaction data indicate a quantity of various other user actions (e.g., likes, comments, shares, follows, address book uploads, sending messages, receiving message, sending member connection requests, accepting member connection requests, performing searches, submitting job application requests, etc.) performed by the particular member through a website of the online social network service. In some embodiments, the member site interaction data indicates the particular member's frequency of use on the online social network service (e.g., do they log in daily, weekly, monthly, etc.) and time spent on the online social network service (e.g., the average length of their online sessions, the total time spent during a given time interval such as one month, etc.).

Thus, if the member site interaction data indicates that a given member tends to click on certain types of website content such as product modules on the homepage of a social network service (e.g., in certain contexts described above), then the relevance module 202 may determine, via the machine learning and prediction modelling techniques described herein, that there is a high likelihood that the given member will click on that type of website content again (e.g., in certain contexts described above). Moreover, if the product onboarding system 200 accesses information indicating a known relationship between website content A and onboarding content item B (e.g., they relate to a similar product, feature, or value proposition of the online social networking service), then the product onboarding system 200 may determine that the high likelihood of clicking on a particular type of website content (e.g., "a jobs you may be interested email" product module accessibly via the homepage of an online social networking service) or a particular type of email content (e.g., "a jobs you may be interested email") may equate to a high likelihood of clicking on the related type of onboarding content item (e.g., a "jobs you may be interested" onboarding content item contained within an email related to another product item, such as a news update email).

In some embodiments, the feature data further includes member profile data including at least one of age, location, industry, current job, employer, experience, skills, education, school, endorsements, seniority level, company size, connection count, and connection identities are associated with the particular member.

In some embodiments, the relevance module 202 may identify one or more similar members of the online social network service that are similar to the particular member. The relevance module 202 may then access data (e.g., member onboarding content item interaction data, member profile data, member email interaction data, and member site interaction data) associated with the one or more similar members, and insert such data associated with the one or more similar members into the feature data utilized to calculate the relevance scores, consistent with various embodiments described herein. In some embodiments, the similar members are identified by accessing member profile data associated with a particular member, and determining a match between member profile data associated with the similar members and the accessed member profile data associated with the particular member.

Thus, if the feature data for similar members indicates that they tend to click on certain types of onboarding content items, email content items, website content items, and so on, then the relevance module 202 may determine, via the machine learning and prediction modelling techniques described herein, that there is a high likelihood that the given member will also click on those types of onboarding content items, email content it, website content, and so on. Moreover, if the product onboarding system 200 accesses information indicating a known relationship between email content A or website content A and onboarding content item B (e.g., they relate to a similar product, feature, or value proposition of the online social networking service), then the product onboarding system 200 may determine that the high likelihood of clicking on a particular type of website content (e.g., "a jobs you may be interested email" product module accessibly via the homepage of an online social networking service) may equate to a high likelihood of clicking on the related type of onboarding content item (e.g., a "jobs you may be interested" onboarding content item contained within an email related to another product item, such as a news update email).

Figure 5:
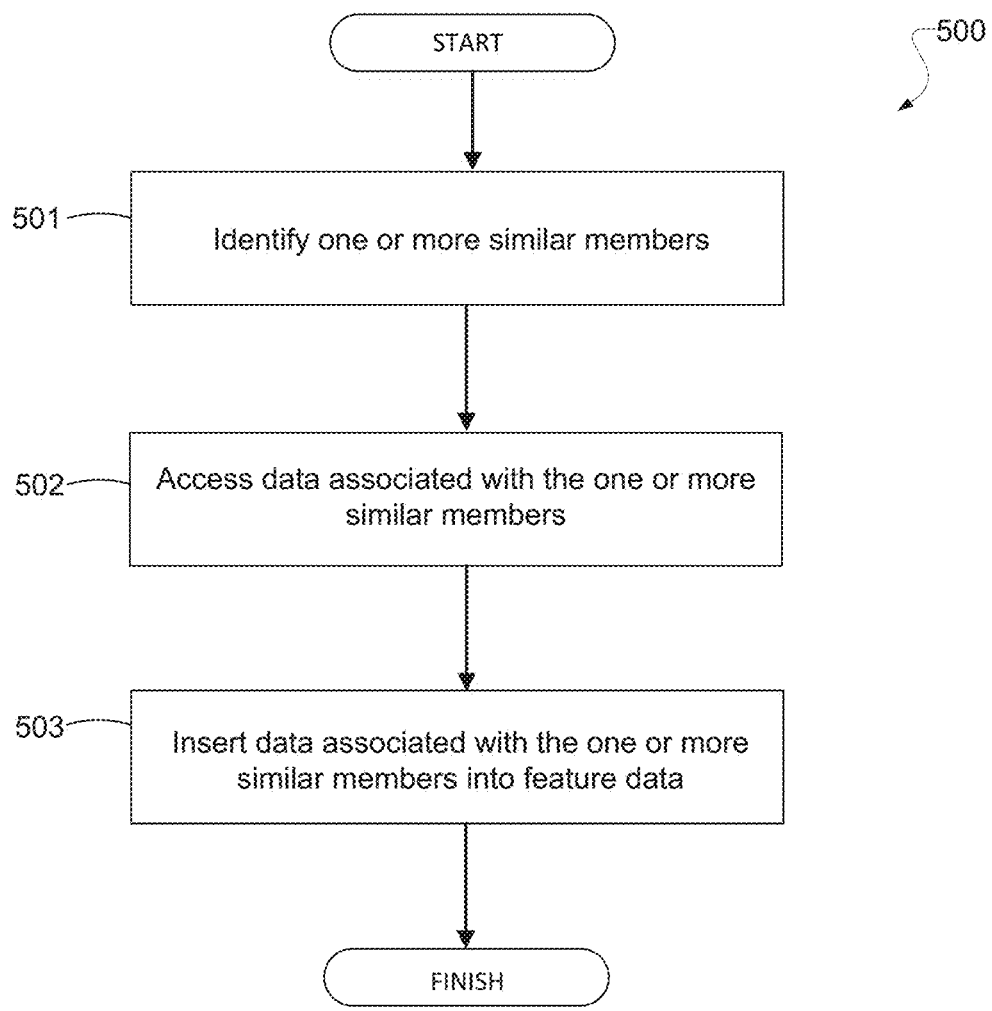
FIG. 5 is a flowchart illustrating an example method, according to various embodiments.

FIG. 5 is a flowchart illustrating an example method 500, consistent with various embodiments described herein. The method 500 may be performed at least in part by, for example, the product onboarding system 200 illustrated in FIG. 2 (or an apparatus having similar modules, such as one or more client machines or application servers). In operation 501, the relevance module 202 identifies one or more similar members of the online social network service that are similar to a particular member. In operation 502, the relevance module 202 accesses data (e.g., member onboarding content item interaction data, member profile data, member email interaction data, and member site interaction data) associated with the one or more similar members identified in operation 501. In operation 503, the relevance module 202 inserts the data accessed in operation 502 (e.g., member onboarding content item interaction data, the member profile data, the member email interaction data, and the member site interaction data associated with the one or more similar members) into the feature data utilized to calculate the relevance scores, consistent with various embodiments described herein. It is contemplated that the operations of method 500 may incorporate any of the other features disclosed herein. Various operations in the method 500 may be omitted or rearranged, as necessary.

In some embodiments, the relevance module 202 may identify one or more member connections that are connected to the particular member via the online social network service. The relevance module 202 may then access data (e.g., member onboarding content item interaction data, member profile data, member email interaction data, and member site interaction data) associated with the one or more member connections, and insert the data associated with the one or more member connections into the feature data utilized to calculate the relevance scores, consistent with various embodiments described herein.

Figure 6:
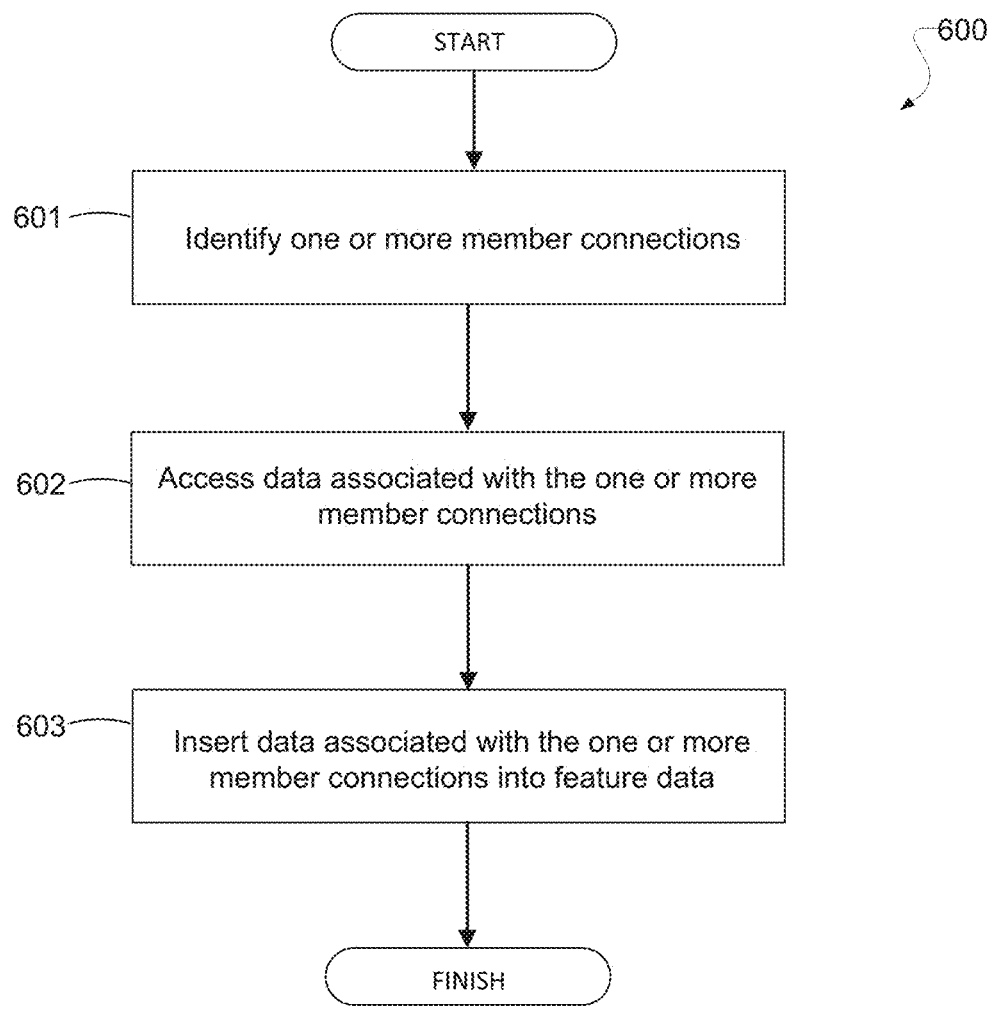
FIG. 6 is a flowchart illustrating an example method, according to various embodiments.

FIG. 6 is a flowchart illustrating an example method 600, consistent with various embodiments described herein. The method 600 may be performed at least in part by, for example, the product onboarding system 200 illustrated in FIG. 2 (or an apparatus having similar modules, such as one or more client machines or application servers). In operation 601, the relevance module 202 identifies one or more member connections that are connected to a particular member via the online social network service. In operation 602, the relevance module 202 accesses data (e.g., member onboarding content item interaction data, member profile data, member email interaction data, and member site interaction data) associated with the one or more member connections identified in operation 601. In operation 603, the relevance module 202 inserts the data accessed in operation 602 (e.g., the member onboarding content item interaction data, the member profile data, the member email interaction data, and the member site interaction data associated with the one or more member connections) into the feature data utilized to calculate the relevance scores, consistent with various embodiments described herein. It is contemplated that the operations of method 600 may incorporate any of the other features disclosed herein. Various operations in the method 600 may be omitted or rearranged, as necessary.

According to various example embodiments, the utility module 204 is configured to select an onboarding content item to be included in an email by optimizing for downstream events (e.g., growth in members or member connections, increase in page views, increase in website revenue, etc.), and not simply based on optimizing the number of predicted clicks of the onboarding content items. For example, as described above, the relevance module 202 may calculate the likelihood that a member clicks on a given onboarding content item (in other words, a predicted click through rate (CTR) of that onboarding content item). Thus, if an Influencer onboarding content item has a higher predicted CTR then a PYMK onboarding content item, then the Influencer onboarding content item may generally be selected over the PYMK onboarding content item, consistent with various embodiments described above. However, the importance of an onboarding content item to a website is not simply how many clicks it receives, but also the downstream events that occur after the user clicks on the onboarding content item.

Thus, in some embodiments, the utility module 204 may determine that different snacks have different downstream events. For example, clicking on PYMK onboarding content item adds growth (e.g., in terms of connections, members on the site, etc.). On the other hand, clicking on an Influencer onboarding content item may lead to an increase in page views and viewership of articles. Depending on current campaigns, business objectives, product goals, etc., growth may be more important to the online social networking service than page views.

Thus, for a given set of utility factors (e.g., page views, growth, revenue, frequency of use on the site, time spent on the site, etc.), each candidate onboarding content item may have an associated utility value for each utility factor. Such utility values may be determined by the utility module 204 by mining user log data that describes user behavior on the online social networking service. For example, the utility module 204 may track what occurs after a user clicks on a particular onboarding content item (e.g., after the user clicks on a PYMK onboarding content item, perhaps a new member connection relationship on the online social networking services is established, whereas after the user clicks on a influencer onboarding content item, perhaps a new page view is recorded). Thus, the utility module 204 may collect data indicating the effect various onboarding content items have on a per member basis or in the aggregate (e.g., a value of 5/10 for a given utility factor and a given onboarding content item indicates a relatively moderate/medium impact on that utility factor by the given onboarding snack).

Figure 7:
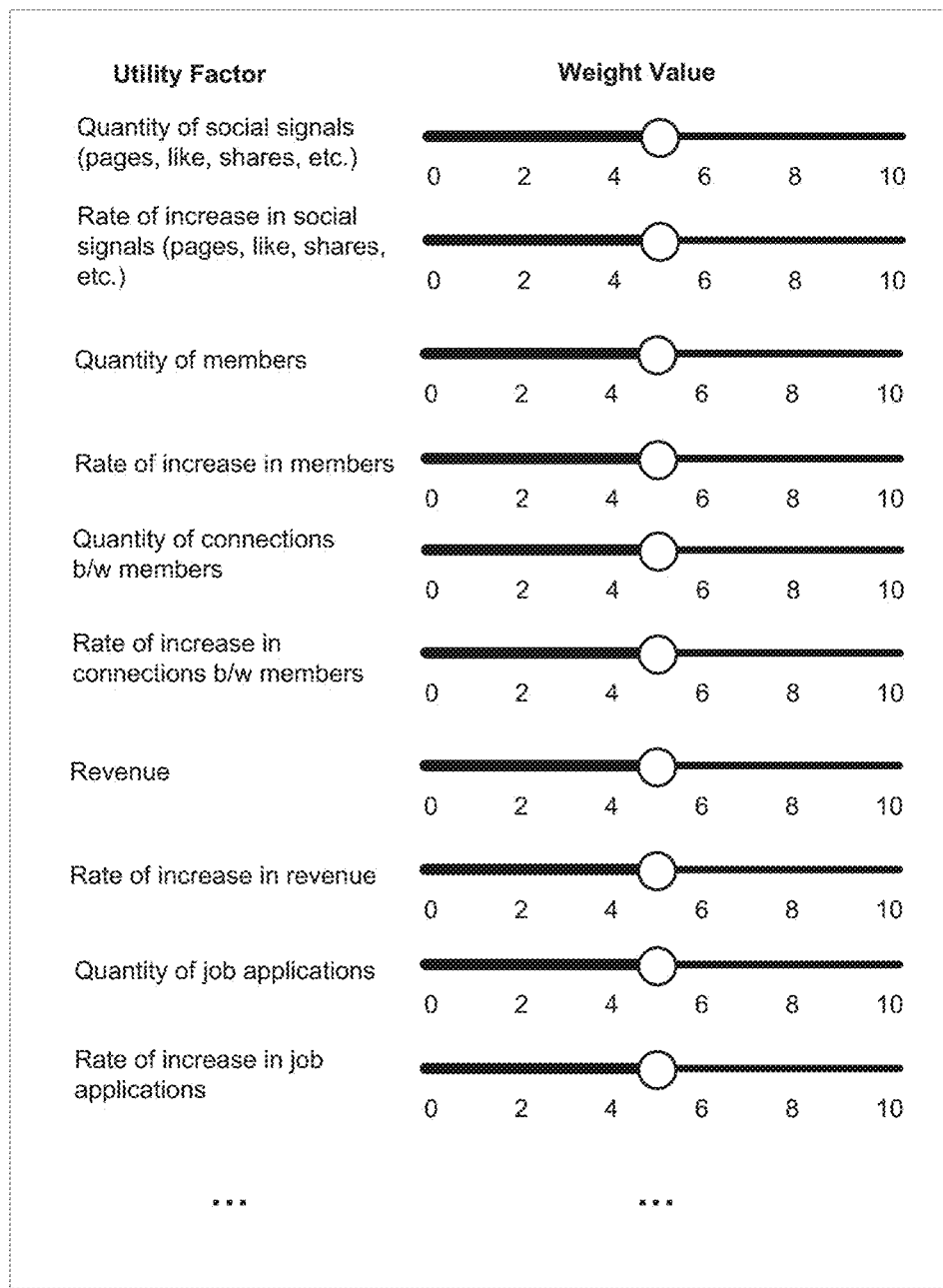
FIG. 7 illustrates an example portion of a user interface, according to various embodiments.

The utility module 204 may then display an internal interface (e.g., a user interface facing an administrator or website personnel of an online social networking service) that allows the operator to define the current business driven importance of each of these utility factors for the business. An example of such an interface 700 is illustrated in FIG. 7 which enables an operator to specify a weight value for each of various utility factors. Based on the weight values specified by the operator, and based on the utility value for the utility factors for a given onboarding content item, the utility module 204 may calculate an overall utility value for that onboarding content item. For example, for a given onboarding content item, the utility module 204 may multiply the utility value for each utility factor (e.g., 10/10 for growth in membership) by the user-specified weight value for that utility factor (e.g., 5/10 indicating moderate importance). The utility module 204 may then add the results of such multiplication operations for a given onboarding content item in order to generate the overall utility value for the given onboarding content item. The utility module 204 may then modify the relevant score (or predicted CTR) for that candidate onboarding content item based on the overall utility value for that onboarding content item (e.g., the utility module 204 may multiply the predicted CTR by the overall utility value). Onboarding content items may then be selected for inclusion in an email, based on the modified relevance scores of those onboarding content items, consistent with various embodiments described herein.

Thus, the utility module 204 enables an online social networking service to incorporate how valuable different snacks are for the business. Thus, even though people are more likely to click on an Influence snack than a PYMK snack, if the business wants to increase growth in membership numbers rather than increase page views, the utility module 204 may select a PYMK snack over Influencer snack, even though the PYMK has a slightly lower relevance score or predicted CTR than the Influencer snack, if it is the case that the PYMK snack has a higher utility (e.g. leads to higher growth in membership numbers) than the Influencer snack.

In some embodiments, the utility factors include a quantity or rate of increase of page views, likes, or shares of content associated with the online social networking service (e.g., a quantity of likes may refer to a number of likes per hour, whereas a rate of increase of likes may refer to the delta/difference between the number of likes per hour during a first hour and a second hour). In some embodiments, the utility factors include a quantity or rate of increase of members associated with the online social networking service. In some embodiments, the utility factors include a quantity or rate of increase of member connections associated with the online social networking service. In some embodiments, the utility factors include a quantity or rate of increase of revenue associated with the online social networking service. In some embodiments, the utility factors include a quantity or rate of increase of job application submissions associated with the online social networking service. In some embodiments, the utility factors include a quantity or rate of increase of job application submissions associated with the online social networking service. In some embodiments, the utility factors include a frequency of use on the online social network service. In some embodiments, the utility factors include a time spent on the online social network service. It should be understood that the above examples of utility factors are non-limiting, and any known utility may be taken into account by the product onboarding system 200. For example, the utility module 204 may display user interface allowing an operator of the product onboarding system 200 to define a new utility (e.g., an event X that may occur after the user clicks on and on boarding content item), and the utility module 204 may determine a value for that utility factor for each type of on boarding content item (e.g., how many times the event X occurs after users click on each type of on boarding content item).

Figure 8:
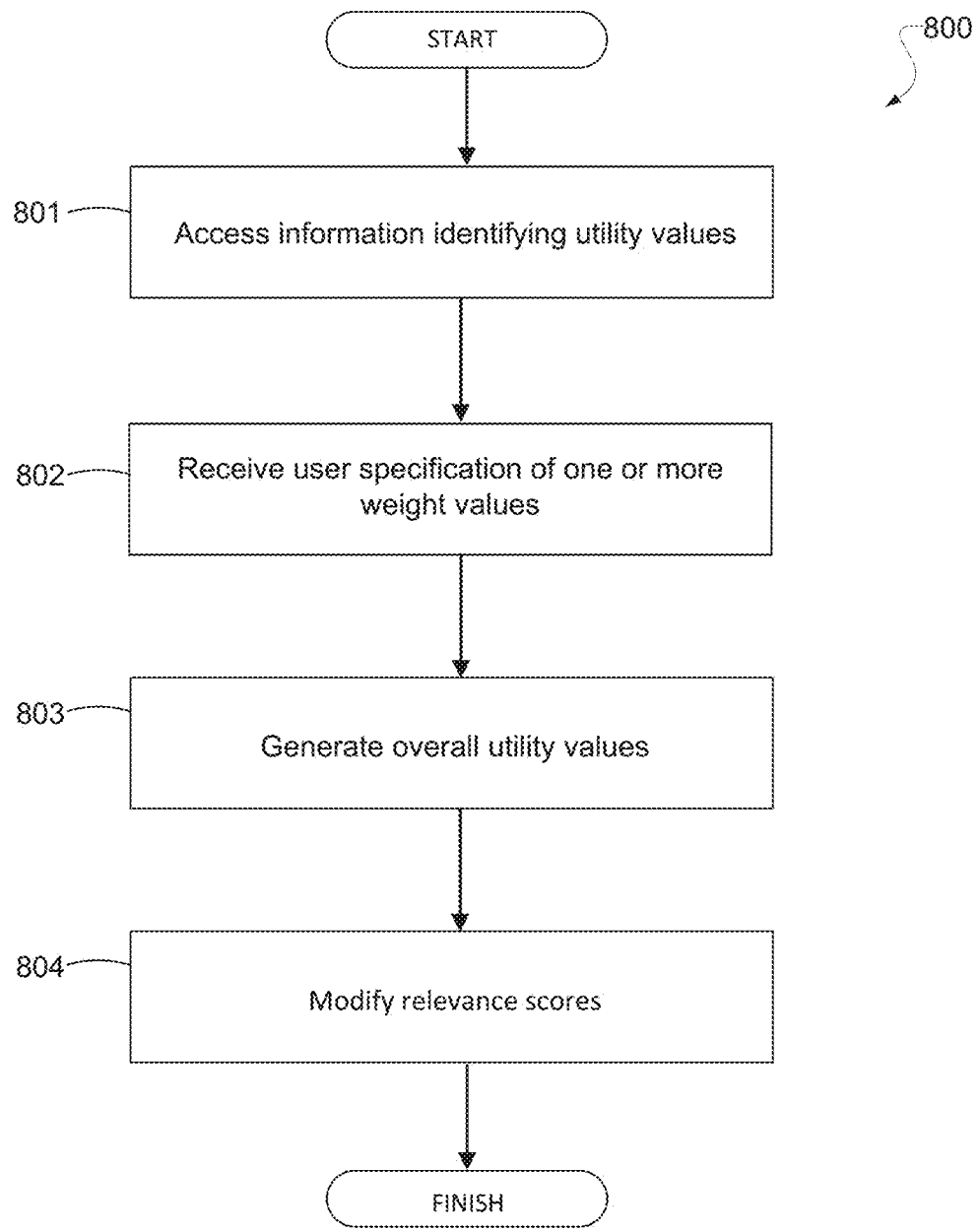
FIG. 8 is a flowchart illustrating an example method, according to various embodiments.

FIG. 8 is a flowchart illustrating an example method 800, consistent with various embodiments described herein. The method 800 may be performed at least in part by, for example, the product onboarding system 200 illustrated in FIG. 2 (or an apparatus having similar modules, such as one or more client machines or application servers). In operation 801, the utility module 204 accesses (e.g., from database 206) information identifying, for each of multiple candidate onboarding content items, utility values for one or more utility factors. In operation 802, the utility module 204 receives, via a user interface (e.g., see interface 700 in FIG. 7), a user specification of one or more weight values associated with each of the utility factors. In operation 803, the utility module 204 generates, for each of the multiple candidate onboarding content items, an overall utility value associated with the corresponding candidate onboarding content item, based on the utility values for the one or more utility factors associated with the corresponding candidate onboarding content item (in the information accessed in operation 801), and based on the user-specified weight values (received in operation 802). In operation 804, the utility module 204 modifies relevance scores for each of the candidate onboarding content items, based on the overall utility values associated with each of the candidate onboarding content items. It is contemplated that the operations of method 800 may incorporate any of the other features disclosed herein. Various operations in the method 800 may be omitted or rearranged, as necessary.

Various embodiments described herein refer to predicted clicks of onboarding content items themselves. For example, in various embodiments described above, the relevance module 202 generates relevance scores indicating a likelihood that a member selects on an onboarding content item in an email. However, according to various example embodiments, the relevance module 202 may generate relevance scores indicating a likelihood that the particular member selects on some other content item (e.g., the body of the email), rather than selecting the onboarding content item itself. For example, the LinkedIn® online social networking service includes a "schools and company in common" onboarding content item that may be displayed in conjunction with an "invitation to connect" email, where this onboarding content item indicates schools and companies that the email recipient has in common with another member (e.g., the other member sending the invitation to connect to the email recipient). In some embodiments, this onboarding content item does not itself include anything to click or interact with, and it is simply there to inform and educate the member, and possibly to entice them to accept the invitation from the other member by clicking on the body of the email. Thus, in this example, the relevance module 202 may generate a relevance score indicating a likelihood that a member selects on the body of the email including such a "schools and company in common" onboarding content item. Accordingly, an onboarding content item may not always be clickable, but may entice the recipient to click on other parts of the email, or it may be there for the purposes of product placement or to inform members about various products or features.

Example Prediction Models

As described above, the relevance module 202 may use any one of various known prediction modeling techniques to perform the prediction modeling. For example, according to various exemplary embodiments, the relevance module 202 may apply a statistics-based machine learning model such as a logistic regression model to the various feature data described herein. As understood by those skilled in the art, logistic regression is an example of a statistics-based machine learning technique that uses a logistic function. The logistic function is based on a variable, referred to as a logit. The logit is defined in terms of a set of regression coefficients of corresponding independent predictor variables. Logistic regression can be used to predict the probability of occurrence of an event given a set of independent/predictor variables. A highly simplified example machine learning model using logistic regression may be $\ln [p/(1-p)] = a + BX + e$, or $[p/(1-p)] = \exp(a+BX+e)$, where ln is the natural logarithm, $\log_{exp}$, where exp=2.71828..., p is the probability that the event Y occurs, p(Y=1), p/(1−p) is the "odds ratio", ln [p/(1−p)] is the log odds ratio, or "logit", a is the coefficient on the constant term, B is the regression coefficient(s) on the independent/predictor variable(s), X is the independent/predictor variable(s), and e is the error term. In some embodiments, the independent/predictor variables of the logistic regression model may correspond to the various feature data described herein (where the various feature data described herein may be encoded into numerical values and inserted into one or more feature vectors). The regression coefficients may be estimated using maximum likelihood or learned through a supervised learning technique from the recruiting intent signature data, as described in more detail below. Accordingly, once the appropriate regression coefficients (e.g., B) are determined, the various features described herein may be included in a feature vector and applied to the logistic regression model in order to predict the probability (or "confidence score") that the event Y occurs (where the event Y may be, for example, a particular member selecting (e.g., clicking on) on a particular onboarding content item or "snack" described herein). In other words, provided a feature vector including the various feature data described herein, the feature vector may be applied to a logistic regression model to determine the probability that a particular member selects (e.g., clicks on) a particular onboarding content item or "snack" described herein. Logistic regression is well understood by those skilled in the art, and will not be described in further detail herein, in order to avoid occluding various aspects of this disclosure. The prediction module 304 may use various other prediction modeling techniques understood by those skilled in the art to generate the aforementioned confidence score. For example, other prediction modeling techniques may include other computer-based machine learning models such as a gradient-boosted machine (GBM) model, a Naïve Bayes model, a support vector machines (SVM) model, a decision trees model, and a neural network model, all of which are understood by those skilled in the art.

According to various embodiments described above, the feature data may be used for the purposes of both offline training (for generating, training, and refining a prediction model and or the coefficients of a prediction model) and online inferences (for generating confidence scores). For example, if the relevance module 202 is utilizing a logistic regression model (as described above), then the regression coefficients of the logistic regression model may be learned through a supervised learning technique from the feature data. Accordingly, in one embodiment, the system 200 may operate in an offline training mode by assembling the feature data into feature vectors. The feature vectors may then be passed to the relevance module 202, in order to refine regression coefficients for the logistic regression model. For example, statistical learning based on the Alternating Direction Method of Multipliers technique may be utilized for this task. Thereafter, once the regression coefficients are determined, the system 200 may operate to perform online (or offline) inferences based on the trained model (including the trained model coefficients) on a feature vector representing the various feature data described herein. According to various exemplary embodiments, the offline process of training the prediction model based on the various feature data described herein may be performed periodically at regular time intervals (e.g., once a day), or may be performed at irregular time intervals, random time intervals, continuously, etc. Thus, since the various feature data described herein may change over time, it is understood that the prediction model itself may change over time (based on the current feature data utilized to train the model).

Example Mobile Device

Figure 10:
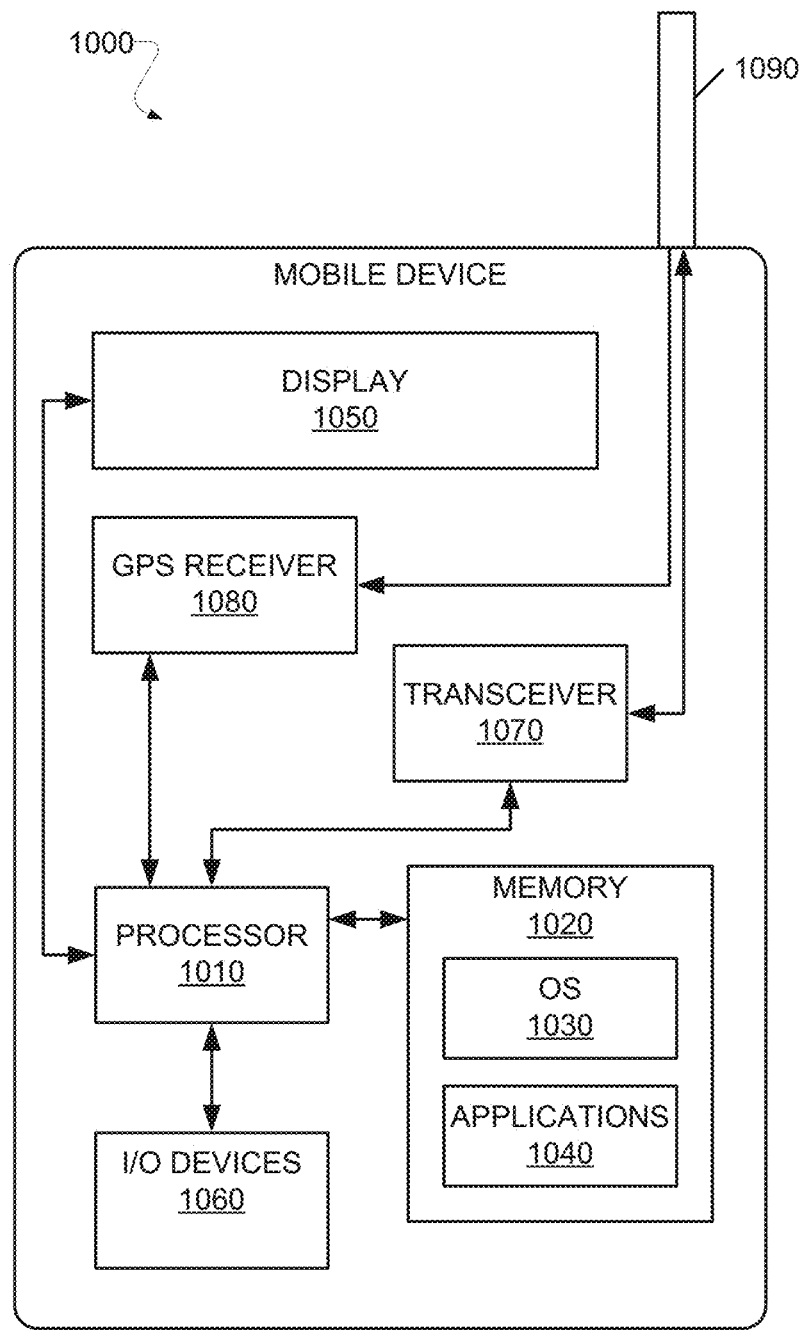
FIG. 10 illustrates an example mobile device, according to various embodiments.

FIG. 10 is a block diagram illustrating the mobile device 1000, according to an example embodiment. The mobile device may correspond to, for example, one or more client machines or application servers. One or more of the modules of the system 200 illustrated in FIG. 2 may be implemented on or executed by the mobile device 1000. The mobile device 1000 may include a processor 1010. The processor 1010 may be any of a variety of different types of commercially available processors suitable for mobile devices (for example, an XScale architecture microprocessor, a Microprocessor without Interlocked Pipeline Stages (MIPS) architecture processor, or another type of processor). A memory 1020, such as a Random Access Memory (RAM), a Flash memory, or other type of memory, is typically accessible to the processor 1010. The memory 1020 may be adapted to store an operating system (OS) 1030, as well as application programs 1040, such as a mobile location enabled application that may provide location based services to a user. The processor 1010 may be coupled, either directly or via appropriate intermediary hardware, to a display 1050 and to one or more input/output (I/O) devices 1060, such as a keypad, a touch panel sensor, a microphone, and the like. Similarly, in some embodiments, the processor 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile device 1000. Further, in some configurations, a GPS receiver 1080 may also make use of the antenna 1090 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
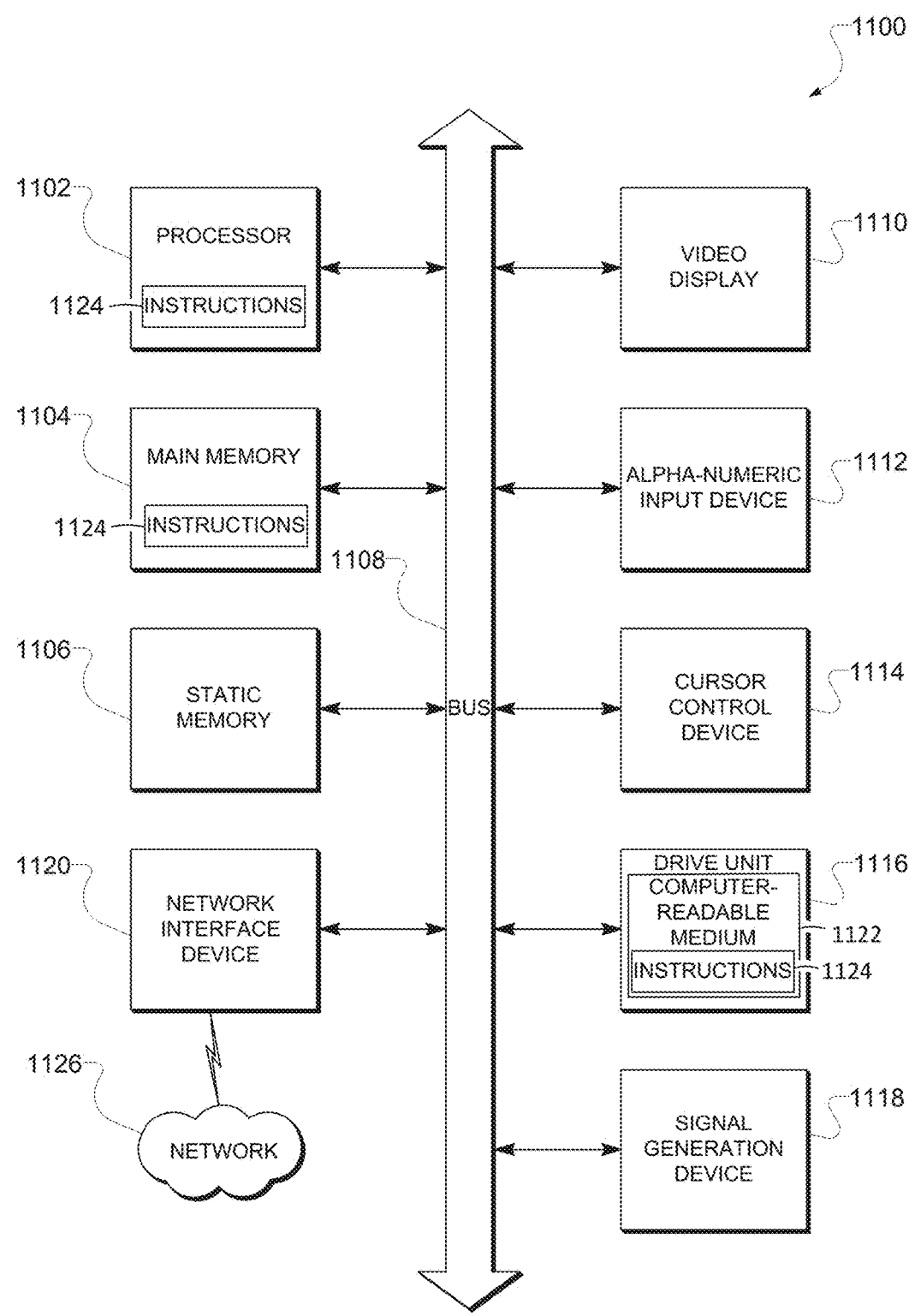
FIG. 11 is a diagrammatic representation of a machine in the example form of a computer system within which a set of instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    displaying, via a user interface, a corresponding user interface element for each one of a plurality of utility factors, each user interface element being configured to enable a user to specify a corresponding weight value to be associated with the utility factor corresponding to the user interface element;
    receiving via the user interface, a user specification of the corresponding weight values to be associated with the plurality of utility factors;
    accessing, via one or more data sources, email content data of an email to be transmitted to a particular member of an online social network service to select a type of the email from a list of available email types;
    accessing, via the one or more data sources, information identifying the plurality of candidate onboarding content items as being associated with the selected email type, each one of the plurality of candidate onboarding content items being configured to promote a product feature associated with the online social network service;
    accessing, via the one or more data sources, feature data including member onboarding content item interaction data describing the particular member's interactions with various onboarding content items;
    accessing information identifying, for each one of the candidate onboarding content items, a corresponding utility value for each one of the plurality of utility factors;
    generating, using one or more processors, for the particular member and the selected email type, a relevance score for each of the candidate onboarding content items based on the email content data, the onboarding content item interaction data, the utility values for the plurality of utility factors for the candidate onboarding content items, and the weight values for the plurality of utility factors, each of the relevance scores indicating a likelihood that the particular member selects the corresponding candidate onboarding content item; and
    selecting, based on the generated relevance scores, a specific onboarding content item from the plurality of candidate onboarding content items.

2. The method of claim 1, further comprising:
    inserting the specific onboarding content item in the email to be transmitted to the particular member; and
    transmitting the email to the particular member.

3. The method of claim 1, wherein the generating of the relevance scores further comprises:
    performing prediction modeling, by a machine including a memory and at least one processor, based on the feature data and a trained prediction model, to predict the likelihood of the particular member selecting the corresponding candidate onboarding content item.

4. The method of claim 1, wherein the member onboarding content item interaction data describes at least one of:
    a number of clicks and impressions by the particular member of the various onboarding content items;
    a number of impressions and clicks by the particular member of the various onboarding content items as displayed in a given email type; and
    a number of impressions and clicks by the particular member of the various onboarding content items as displayed in an email in combination with additional onboarding content items.

5. The method of claim 1, wherein the feature data further includes member email interaction data describing the particular member's interactions with various email content associated with the online social network service.

6. The method of claim 1, wherein the feature data further includes member site interaction data describing the particular member's interactions with various products or content associated with a website of the online social network service.

7. The method of claim 1, wherein the feature data further includes member profile data including at least one of age, location, industry, current job, employer, experience, skills, education, school, endorsements, seniority level, company size, connection count, and connection identities are associated with the particular member.

8. The method of claim 1, further comprising:
identifying one or more similar members of the online social network service that are similar to the particular member based on profile data of the one or more similar members matching profile data of the particular member;
accessing at least one of member onboarding content item interaction data, member profile data, member email interaction data, and member site interaction data associated with the one or more similar members; and
inserting at least one of the member onboarding content item interaction data, the member profile data, the member email interaction data, and the member site interaction data associated with the one or more similar members into the feature data.

9. The method of claim 1, further comprising:
identifying one or more member connections that are connected to the particular member via the online social network service;
accessing at least one of member onboarding content item interaction data, member profile data, member email interaction data, and member site interaction data associated with the one or more member connections; and
inserting at least one of the member onboarding content item interaction data, the member profile data, the member email interaction data, and the member site interaction data associated with the one or more member connections into the feature data.

10. The method of claim 1, further comprising:
modifying the relevance scores for each of the candidate onboarding content items, based on the overall utility values associated with each of the candidate onboarding content items.

11. The method of claim 1, wherein the utility factors include a quantity or rate of increase of page views, likes, or shares of content associated with the online social networking service.

12. The method of claim 1, wherein the utility factors include a quantity or rate of increase of members associated with the online social networking service.

13. The method of claim 1, wherein the utility factors include a quantity or rate of increase of member connections associated with the online social networking service.

14. The method of claim 1, wherein the utility factors include a quantity or rate of increase of revenue associated with the online social networking service.

15. The method of claim 1, wherein the utility factors include a quantity or rate of increase of job application submissions associated with the online social networking service.

16. The method of claim 1, wherein the utility factors include a frequency of use of the online social network service.

17. The method of claim 1, wherein the utility factors include a time spent on the online social network service.

18. A system comprising:
one or more data sources; and
a relevance module, comprising one or more processors, configured to:
display, via a user interface, a corresponding user interface element for each one of a plurality of utility factors, each user interface element being configured to enable a user to specify a corresponding weight value to be associated with the utility factor corresponding to the user interface element;
receive, via the user interface, a user specification of the corresponding weight values to be associated with the plurality of utility factors;
access, via the one or more data sources, email content data of an email to be transmitted to a particular member of an online social network service to select a type of the email from a list of available email types;
access, via the one or more data sources, information identifying the plurality of candidate onboarding content items as being associated with the selected email type, each one of the plurality of candidate onboarding content items being configured to promote a product feature associated with the online social network service;
access, via the one or more data sources, feature data including member onboarding content item interaction data describing the particular member's interactions with various onboarding content items;
access information identifying, for each one of the candidate onboarding content items, a corresponding utility value for each one of the plurality of utility factors;
generate, for the particular member and the email type, a relevance score for each of the candidate onboarding content items based on the email content data, the onboarding content item interaction data, the utility values for the plurality of utility factors for the candidate onboarding content items, and the weight values for the plurality of utility factors, each of the relevance scores indicating a likelihood that the particular member selects the corresponding candidate onboarding content item; and
select, based on the generated relevance scores, a specific onboarding content item from the plurality of candidate onboarding content items.

19. A non-transitory machine-readable storage medium comprising instructions that, when executed by one or more processors of a machine, cause the machine to perform operations comprising:
displaying, via a user interface, a corresponding user interface element for each one of a plurality of utility factors, each user interface element being configured to enable a user to specify a corresponding weight value to be associated with the utility factor corresponding to the user interface element;
receiving, via the user interface, a user specification of the corresponding weight values to be associated with the plurality of utility factors;
accessing, via one or more data sources, email content data of an email to be transmitted to a particular member of an online social network service to select a type of the email from a list of available email types;
accessing, via the one or more data sources, information identifying the plurality of candidate onboarding content items as being associated with the selected email type, each one of the plurality of candidate onboarding content items being configured to promote a product feature associated with the online social network service;
accessing, via the one or more data sources, feature data including member onboarding content item interaction data describing the particular member's interactions with various onboarding content items;

accessing information identifying, for each one of the candidate onboarding content items, a corresponding utility value for each one of the plurality of utility factors;

generating, for the particular member and the selected email type, a relevance score for each of the candidate onboarding content items based on the email content data, the onboarding content item interaction data, the utility values for the plurality of utility factors for the candidate onboarding content items, and the weight values for the plurality of utility factors, each of the relevance scores indicating a likelihood that the particular member selects the corresponding candidate onboarding content item; and selecting, based on the generated relevance scores, a specific onboarding content item from the plurality of candidate onboarding content items.

* * * * *

UNITED STATES PATENT AND TRADEMARK OFFICE
CERTIFICATE OF CORRECTION

PATENT NO. : 10,110,543 B2  
APPLICATION NO. : 14/631728  
DATED : October 23, 2018  
INVENTOR(S) : Irmak et al.

Page 1 of 1

It is certified that error appears in the above-identified patent and that said Letters Patent is hereby corrected as shown below:

In the Claims

In Column 19, Line 65, in Claim 1, after "receiving", insert --,--

Signed and Sealed this  
Twenty-eighth Day of April, 2020

Andrei Iancu  
*Director of the United States Patent and Trademark Office*